United States Patent

[11] 3,625,360

| [72] | Inventor | Alfred Schickel<br>Freiberg/Saxon, Germany |
| --- | --- | --- |
| [21] | Appl. No. | 825,759 |
| [22] | Filed | May 19, 1969 |
| [45] | Patented | Dec. 7, 1971 |
| [73] | Assignee | Deutsche Akademie Der Wissenschaften Zu Berlin Institut Fur Aufbereitung<br>Freiberg/Saxon, Germany |

[54] ELECTROSTATIC SEPARATION METHOD AND APPARATUS
13 Claims, 1 Drawing Fig.

[52] U.S. Cl. ................................................. 209/127 B,
    209/127 C
[51] Int. Cl. ..................................................... B03c 7/12
[50] Field of Search ........................................... 209/127, 9, 128–131;

[56] References Cited
UNITED STATES PATENTS

| 676,391 | 5/1901 | Cope | 209/244 |
| --- | --- | --- | --- |
| 1,116,951 | 11/1914 | Sutton | 209/128 X |
| 2,782,923 | 2/1957 | Cook et al. | 209/127.1 X |
| 3,059,772 | 10/1962 | Le Baron | 209/127 |
| 3,249,225 | 5/1966 | Stuetzer et al. | 209/129 |
| 3,308,944 | 3/1967 | Chamberlain et al. | 209/129 X |

Primary Examiner—Frank W. Lutter
Assistant Examiner—William Cuchlinski, Jr.
Attorney—Michael S. Striker ABSTRACT: A process and accompanying apparatus through which finely intermixed particles are separated into their individual components or groups of components. A feed hopper by which the rate of flow of a production process can be controlled through the application of perforated plates, allows the mixture of particles to fall freely through a high-voltage charger which charges the particles through ionic current of a corona discharge. The particles fall freely through the charger and then impinge upon a series of baffles spaced from each other and arranged so that the particles impinge upon the baffles which are connected to ground potential, and thereupon drop through spaces between the baffles. The baffles discharge the particles as a function of their surface conductivities while contacting the particles. A plate capacitor beneath the baffles serves to separate the discharged particles and to deflect them in accordance with the components or group components to which they belong to. A V-shaped collector beneath the capacitor plates serves to collect the grouped and sorted particles.

PATENTED DEC 7 1971
3,625,360
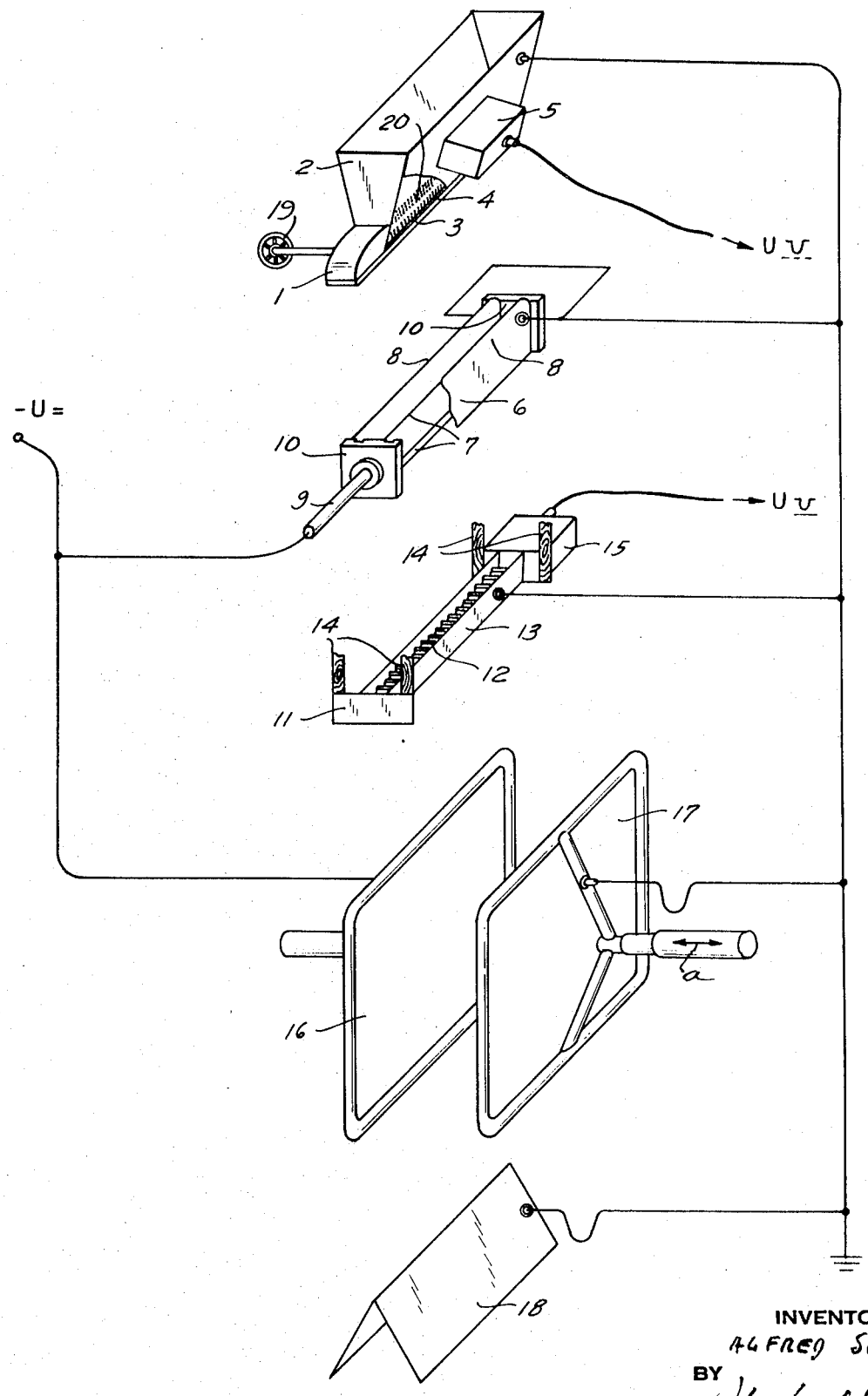
INVENTOR
ALFRED SCHICKEL
BY
ATTORNEY

ELECTROSTATIC SEPARATION METHOD AND APPARATUS

BACKGROUND OF THE INVENTION

The present invention resides in an electrical sorting process and associated separating apparatus which functions in the form of a free-fall corona separator. This sorting apparatus can be used for natural and synthetic granular materials such as heavy mineral sands, other mining raw materials and chemical synthetic products. The apparatus of the present invention is adapted to separate these materials into their individual constituents or components. The sorting apparatus can also be used for enriching costly end-concentrates from washed glass sand, for reclaiming nonferrous metals from processes for preparing molding sand, for separating weeds and foreign constituents in seed products, and to many other sorting problems.

In the conventional electrical separators, the granules or grains within the mixture to be sorted, are almost exclusively electrically charged in ionic current of a corona discharge through polarization in an electrostatic field with one grounded electrode, or through actual contact. The latter is carried out through rubbing among the granules, through rubbing between the granules and a grounded electrode, or through contact between the granules and the operating medium. Corresponding to their specific electrical properties, granules which are of equal size but are different components or constituents within the mixture, assume different charges and induced dipoles. As a result, different electrical forces arise in the electrostatic or corona field. This feature causes the granule mixture to be separated into its constituents or components, and a sorting process thereby takes place. The mixture to be sorted is fed to the separators in layers of a single granule thick, or layers which are only a few granules thick.

Accordingly, in all processes which are not based on the free-fall principle as, for example, in all electrostatic and corona roll separators, as well as in jalousie type separators, etc., the specific passage per unity of electrode length is relatively low. As a result, these processes and separators become uneconomical in relation to other high-production sorters and sorting processes as, for example, the flotation process. The application of electrical processes thereby remains confined mainly for enriching costly or valuable end-concentrates as, for example, diamonds, placer gold, etc., and strategically essential materials as zirconium, ilmenite, etc.

The conventional free-fall processes achieve, on the other hand, essentially higher specific processed amounts, but these conventional processes possess another disadvantage. In modern roll separators the granules of the mixture are principally charged in ionic current of a corona discharge so that they are charged specifically in accordance with the material. This is also sporadically accomplished through application of the polarization in electrostatic field or a grounded electrode, or the electrical charging through electrical contact effects. The corona charging in accordance with specific properties of materials is, however, not solved in the free-fall sorting. It is to be noted here that the chamber corona separation is not an electrical sorting process, but is, instead, an electrical classifying process. This is due to the condition that the electrical charging of the granule is independent of the different components within the mixture and of their specific electrical material properties.

It is the object of the present invention to provide an electrical sorting process and a separating apparatus required for carrying out this process, which achieve high specific production rates when compared to other high-speed or high-production sorting processes as, for example, the flotation process. The process and apparatus, in accordance with the present invention, is designed to give rise to the maximum largest coulomb forces acting upon the granules within the mixture.

A task of the present invention is to electrically charge with the maximum possible intensity, the granules of the mixture to be sorted, so that these granules are charged with the least amount of hindering action amongst themselves, for reasons of maintenance under high specific production rates. It is then the task of the present invention to discharge the granules in accordance with their specific electrical properties, and to separate them under desirable conditions. It is furthermore the task of the present invention to carry out the process so that the individual steps are independent from each other.

The objects and tasks of the present invention are achieved by providing that the mixture to be processed is passed through the separator under free-fall conditions, and that the mixture is fed through a two-dimensional surface. The surface feeding is achieved through a specific design of the feed hopper or storage bin. In particular, the basic surface of the hopper or feed bin, is comprised of two metallic plates arranged over each other. These plates are provided with regularly spaced and distributed perforations or holes which may be covered. The perforations or holes have a diameter exceeding several times the largest granule diameter which may be expected within the feed mixture. Uniform passage of the granules through the perforations or holes is maintained through the application of a vibrator which is secured to a sidewall of the hopper and serves to shake the same. The rate of passage of the material or production rate may be varied within predetermined limits, by moving one of the baseplates of the hopper in relation to another plate which is fixed in place, and thereby varying or adjusting the effective opening of the perforations in the two plates combined. The granules within the mixture then fall through a steady-state electrical field of a DC corona discharge extending vertically so that the granules acquire the maximum possible charge within ionic current of negative polarity. The granules become charged in free-fall through an arrangement designed to have, on one hand, considerably curved high-voltage electrodes and, on the other hand, grounded electrodes. A corona discharge takes place between these electrodes.

After falling further, the uniformly charged granules impinge upon metallic baffle elements which are grounded. The granules become discharged while in contact with these baffle elements. The discharge of the granules varies in accordance with their surface conductivity. Thus, comparable granules, that is, granules of equal size which are, however, different components with different surface conductivities, retain charges of different amounts. To differentiate the surface conductivities of different components, the mixture may be treated as required for sorting through heating to a predetermined temperature or treating the mixture chemically. The heating process is designated as a thermal conditioning of the mixture, whereas the chemical treatment process is designated as chemical conditioning of the mixture. The different discharge of the granules is accomplished through an arrangement designed in the form of baffle elements which are arranged within a frame so that the impinging granules will impinge upon the baffles or impact elements under electrical contact with them and, at the same time, drop through between the baffle elements. Passage of the granules between the baffle elements is aided through mechanical vibrations applied to the frame by means of a vibrator. The frame is suspended so that it may be free to swing.

The differently discharged granules of the different components of the mixture fall finally through an electrostatic field by which they become differently deflected as a result of the applied coulomb forces associated with their charges. After passing through the electrostatic field, the components or component groups become separately collected. It is to be noted thereby, that the difference between the largest and smallest granules within the mixture or the bandwidth of the grain sizes remains within predetermined limits. This condition prevails because otherwise the granules have superimposed upon them a disturbing type of separation in accordance with granule size or classification. This condition is based on the requirement that the mass of a granule or particle increases with the third power of the granule radius, whereas the electrical charge only increases as the square of the granule radius. The electrostatic deflection field is produced through a plate capacitor in which one plate or electrode is connected to the high DC voltage and the other plate or electrode is connected to ground potential. In a particular construction and design of the present invention, the high-voltage electrodes and the baffle elements may be in the form of a special geometrical configuration.

With the application of the principle of free fall in connection with the surface characteristics of the feed arrangement, a substantially higher production rate is achieved than in the conventional electrical separators with one-dimensional feeding.

In accordance with the process described above, therefore, it is possible to charge the granules through a specifically designed arrangement and then to discharge them differently in a discharging arrangement. The granules acquire maximum charge in the free-fall sorting process based upon a two-dimensional feed. The charging of the granules is accomplished in an ionic current of a corona discharge, and the granules are then discharged in accordance with their surface conductivities so that a different discharge is realized with different components within the mixture.

It is of particular significance that in accordance with the process of the present invention, the charging, different discharging and deflection of the granules takes place in timely sequence and in steps which are independent of each other. These conditions are essentially not to be found in the conventional processes. By maintaining the process steps individually independent of each other, it is possible to adjust one step to its optimum state without disturbing the others. It is possible, furthermore, in accordance with the present invention, to apply fully quantitative analysis to the sorting process, and to predict and design with accuracy the functional parts of the separator. These features are not applicable to most of the conventional processes and separators, and for this reason the present invention is of special significance because it allows rational development and construction of the equipment.

The separator is relatively reliable in operation and is substantially free from maintenance and wear since no moving parts are involved with the exception of the vibrators mounted externally to the frame of the discharger and to the feed hopper. The energy for power consumption of the separator is notably low, since it is confined to the maintenance of the corona discharge and the power requirements of one or two vibrators. Personnel operating costs are also low since with mechanical feeding, a number of separators require only a single operating force.

As a result of the features of the present invention, it is also possible to gain or derive high valued end-concentrates from relatively low-valued materials as, for example, sand used for raw materials in glass, molding sands, and molding sand which is discarded or is waste material.

SUMMARY OF THE INVENTION

A process and arrangement for separating granular particles from a mixture into components or groups of components. The intermixed particles are released for free fall from a feed hopper which has a movable plate overlapping a fixed plate. Both plates include perforations which may be partially covered so as to control the rate of flow through the perforations and out of the feed hopper. The freely falling particles are dropped through a corona discharge device in which the particles become charged to the maximum possible value through the ionic current of the corona discharge. After being thus charged, the charged particles impinge upon a series of baffles made of conductive metallic material connected to ground potential. The arrangement of the baffles is such that the freely falling particles become differently discharged during contact with the baffles while, at the same time, they fall through spaces between the baffles. The discharging of the particles is made dependent upon the surface conductivities of the particles. After passing through the baffle arrangement, the particles fall through a plate capacitor having one plate connected to ground potential. As a result of the electrostatic field between the capacitor plates, the particles become separated in accordance with their different charges remaining upon the particles. A deflection device of roof-shaped sheet metal structure below the capacitor serves to gather the separated particles in two different components or groups of components.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

A functional diagram showing the process and the arrangement by which particles within a mixture are separated into different groups or components, in accordance with the present invention.

DESCRIPTION OF THE PREFERRED EMBODIMENTS

Referring to the drawing for carrying out the process, in accordance with the present invention, the adjustable perforated plate 3 is moved or displaced relative to the fixed perforated plate 4 when turning the handwheel 19 of the mechanical unit 1 at the feed bin 2. Depending upon the desired amount of feed per unit time, the bores in both perforated plates will overlap either partially or entirely. In this manner a surface feeding may be realized. When dosing granules which are not readily pourable, a storage bin or feed hopper 2 has applied to it mechanical vibrations through the vibrator unit 5 which is of conventional design and which shakes the feed hopper 2. In this manner, a uniform and sufficient feed is realized. The vibrator is energized with pulsating DC current which may be adjusted through an adjusting transformer in the power supply of the current. The feed hopper 2 is connected to ground potential for purposes of realizing thereon a definite potential, as well as for safety reasons.

After falling a predetermined distance, the granules reach the arrangement 6 with a steady-state electrical field of a DC corona discharge. The vertical distance of the DC corona discharge is measured so that the granules within the ionic current of the discharge assume the maximum possible charged state corresponding to the permissible high voltage applied. The high-voltage electrodes 7 of the arrangement 6 are connected to a continually adjustable high-voltage apparatus with asymmetrical negative output polarity. As a result, the ions which travel from the high-voltage electrodes 7 to the grounded electrodes 8 of the arrangement 6, are also of negative polarity. This condition is advantageous from the viewpoint of electrically charging the granules, since unlike positive ions, negative ions in the air incur small losses due to recombination. By varying the high voltage, the required ionic current for charging the granules may be realized in the corona discharge according to the state of production.

The granules which are negatively charged, fall a further distance onto the grounded metallic baffle or impact elements 12 which are designed in the form of cylindrical rods within the frame 13. The granules flow through these elements 12. During the electrical contact with the grounded cylindrical rods, the granules discharge differently depending upon the individual components within the mixture and their corresponding surface conductivity. Thus, comparable granules of equal size and of different components with different surface conductivities remain differently charged but of the same polarity. When sorting granules which do not tend to flow readily or tend to electrostatic pinning due to their low surface conductivity, the electromagnetic vibrator 15 applies mechanical oscillations or vibrations to the grounded metallic frame 13 with the cylindrical rods. These mechanical vibrations assure the passage of the materials. The vibrator 15 has applied to it pulsating DC current of the required magnitude, similar to that described in relation to the vibrator 5.

The differently discharged granules of different components with the mixture fall through the electrostatic field of a plate capacitor after passage through a predetermined distance. The fixed capacitor plate or electrode 16 is connected to the same high-voltage DC source, as the high-voltage electrodes 7 of the arrangement 6. The other electrode 17 of the capacitor is of the adjustable type and is connected to ground potential. Within the electrostatic field, the granules become differently deflected as a result of the coulomb forces or electrostatic forces applied to the granules in view of the charges carried by them. After passing the electrostatic field, accordingly, the components or component groups within the mixture may be separately received and in different directions by a grounded conducting foil or sheet metal member 18.

To carry out the process, in accordance with the present invention, a separator is used which includes a feed hopper 2 for realizing surface feeding of the mixture, an arrangement 6 for charging the granules in a corona field, an arrangement 11 for differently discharging the granules, a plate capacitor and a conducting sheet metal member 18. These parts or elements of the separator are built within a structure and situated in the relative positions shown. This enclosing structure, however, is not shown in the drawing for purposes of maintaining clarity.

The storage bin of the feed hopper 2 has a base surface in the form of a perforated plate 4 beneath which a further perforated plate 3 is arranged. The perforated plate 3 may be displaced parallel to the perforated plate 4, by means of a drive unit 1. The bores or holes of both perforated plates 3 and 4 are uniformly distributed and arranged so that they may all be covered. A small strip 20 free of perforations is provided within each of the perforated plates and above the high-voltage electrodes 7 which are designed in the form of corona wires or cables. The high-voltage electrodes 7 are within the arrangement 6 for charging the granules in a corona field. The narrow strip 20 within the perforated plates 3 and 4 provide that the granules do not come into contact or within the proximity of the corona wires 7. The diameter of the bores or perforations is several times as large as the anticipated diameter of the largest granules within the feed hopper. By displacing the perforated plate 3, analogous bores or perforations in both plates 3 and 4 overlap more or less so that the effective opening of corresponding pairs of bores or perforations may be more or less varied. A vibrator 5 is mounted along the longitudinal side of the feed hopper 2. The vibrator 5 is of the electromagnetic type and serves to rattle or shake the hopper. Since the latter function is the only one of the vibrator 5, the assembly of the hopper within the separating apparatus, is relatively noncritical. It is adequate to secure the hopper to the apparatus of the separator with angle iron through the use of screws after inserting rubber inserts. The feed hopper 2 is connected electrically to ground potential for purposes of acquiring definite potential and safety reasons.

After allowing the granules to fall a predetermined distance set from the electrostatic viewpoint and to permit observation, the granules reach the arrangement 6 vertically below the feed hopper 2. The arrangement 6 serves to charge the granules in a corona field. A box-shaped member which is open at the bottom and top is formed from two grounded sheet metal electrodes 8 and two insulating spacing members 10. The magnitude and shape of the opening of the box-shaped member corresponds to the base surface of the feed hopper 2. In the center between the two grounded sheet metal members 8, two corona wires 7 are provided parallel to the planes of the members 8. These corona wires as high voltage electrodes 7 extend horizontally between the insulating or isolating spacing members 10 one-third and two-thirds of the height of the box-shaped member. An input isolator 9 is mounted upon one of the isolating or insulating spacing members 10. The two corona wires are connected to the high voltage supply through this input isolator 9.

Another distance separates the arrangement 6 from the apparatus 11 which is vertically beneath the arrangement 6 for the purpose differently discharging the granules. A horizontally grounded metallic frame 13 is mounted to leaf springs 14 designed in the form of wooden leaf springs. The mounting of the frame 13 is such that it is free to oscillate or vibrate. The frame has the shape and magnitude of the horizontal cross section through the arrangement 6 for charging the granules in a corona field. Within the frame 13 lie a number of baffle elements 12 arranged in rows of grounded metallic cylindrical rods. These baffle elements are arranged horizontally and parallelly spaced in an interchangeable auxiliary frame. The rods are arranged so that a gap prevails along a row under each one of the rods, as well as above any rod within a row. An electromagnetic vibrator 15 is mounted at one narrower side of the frame 13. The vibrator 15 serves to apply firm vibrations to the frame 13 and to the auxiliary frame with the grounded cylindrical rods. The applied mechanical vibrations are of substantial amplitude.

A plate capacitor is provided a further distance below the arrangement 11 for deflecting differently the granules. One electrode or plate 16 of the capacitor is connected to the DC high-voltage source to which both corona wires as high-voltage electrodes 7 are also connected. The other plate 17 of the capacitor is connected to ground potential. Both plates are vertical and parallel in relation to each other, and are arranged along the longitudinal sides of the frame 13. The high-voltage plate 16 is fixed in place and is located with respect to the corresponding longitudinal side of the frame 13, so that the falling granules of the mixture will not contact the plate. The capacitor plate or electrode 17, on the other hand, is adjustable in direction of the arrow $a$ in its spacing relative to the plate 16. The distance between the plates can amount to three-quarters the height of the plate. In such a position, the capacitor plate 17 is located far outside of the corresponding projected longitudinal side of the frame 13. This feature of variable position of the capacitor plate 17 is a requirement, in accordance with the present invention, since all granules are deflected in the direction of capacitor plate 17.

The roof-shaped grounded sheet metal member 18 is located beneath the capacitor plates 16 and 17 by a predetermined distance. With the aid of this member 18, the separated products are deflected in different directions. Depending on the prevailing sorting problem, the member 18 may be moved or transferred horizontally.

It will be understood that each of the elements described above, or two or more together, may also find a useful application in other types of constructions differing from the types described above.

While the invention has been illustrated and described as embodied in sorters of granular material, it is not intended to be limited to the details shown, since various modifications and structural changes may be made without departing in any way from the spirit of the present invention.

What is claimed as new and desired to be protected by Letters Patent is set forth in the appended claims;

1. A process for sorting mixed particles comprising the steps of releasing the mixed particles to fall freely in a substantially laminar stream; charging the mixed particles electrically through a corona discharge within the path of the freely falling mixed particles; discharging said particles after charging as a function of their surface conductivities through contact with ground potential into differently discharged particles; and separating said differently discharged particles through an electrostatic field within the path of the freely falling particles into groups of sorted particles.

2. The process for sorting mixed particles as defined in claim 1 wherein said mixed particles are electrically charged to their maximum possible value.

3. The process for sorting mixed particles as defined in claim 1 including the step of applying mechanical vibrations to said mixed particles for controlling the rate of flow of said particles in said laminar stream.

4. The process for sorting mixed particles as defined in claim 1 wherein said mixed particles are charged through an ionic current of negative polarity of said corona discharge.

5. The process for sorting mixed particles as defined in claim 4 including the step of varying the ionic current for varying rates of flow of said freely falling particles by varying the applied voltage associated with said corona discharge.

6. The process for sorting mixed particles as defined in claim 1 including the step of applying mechanical vibrations of varying intensity to said particles during the contact thereof with said ground potential for inducing free flow of said particles.

7. An arrangement for sorting mixed particles comprising, in combination, feed hopper means; perforated plate means on said feed hopper means for adjusting the rate of flow of said particles from said feed hopper means, said plate means including a perforated movable plate overlapping a perforated fixed plate; corona discharge electrode means beneath said plate means and said feed hopper means and having openings for passing said freely falling particles; a source of high voltage for applying high voltage to said corona discharge electrode means for charging said freely falling particles; baffle means below said corona discharge electrode means in the path of said freely falling particles whereby said particles strike said baffle means and thereupon fall through spaces between individual baffles in said baffle means, said baffle means being connected to ground potential; plate capacitor means beneath said baffle means and having one fixed capacitor plate and one capacitor plate adjustable in a direction toward and away from said fixed capacitor plate, said freely falling particles passing through the space between said capacitor plates, one plate being connected to ground potential and the other plate of said capacitor means being connected to said source of high voltage; and V-shaped grounded guide means beneath said capacitor plate means for collecting said freely falling particles into groups of sorted particles.

8. The arrangement as defined in claim 7 including vibrating means mounted on said feed hopper means.

9. The arrangement as defined in claim 7 wherein said plates include perforated holes with diameter substantially larger than the largest expected diameter of said particles.

10. The arrangement as defined in claim 9, and including means connected to said movable plate for changing the position thereof relative to said fixed plate to thereby change the overlap of the perforations provided in said plates.

11. The arrangement as defined in claim 7 including vibrating means for applying vibrations to said baffle means.

12. The arrangement as defined in claim 7, wherein said corona discharge electrode means comprise a pair of high-voltage electrodes arranged in a vertical plane one above the other and a pair of ground electrodes respectively located to opposite sides and spaced from said plane and wherein each of said perforated plates comprises a narrow strip free of perforations located above said pair of high-voltage electrodes.

13. An arrangement for sorting mixed particles comprising, in combination, feed hopper means for storing and releasing said mixed particles to fall freely along a predetermined path of free fall; perforated plate means on said hopper for controlling the rate of flow of particles from said hopper; particle-charging means within the path of said freely falling particles for electrically charging said mixed particles through a corona discharge; particle-discharging means for discharging said particles and located beneath said particle-charging means, said discharging means discharging said particles as a function of their surface conductivities through contact with ground potential and thereby passing differently discharged particles from said discharge means; and separating means for separating said differently discharged particles through an electrostatic field within the path of said freely falling particles, said separating means separating said particles into groups of sorted particles.

* * * * *